United States Patent
Hirvonen et al.

(10) Patent No.: US 9,712,556 B2
(45) Date of Patent: Jul. 18, 2017

(54) PREVENTING BROWSER-ORIGINATING ATTACKS

(71) Applicant: F-Secure Corporation, Helsinki (FI)

(72) Inventors: Timo Hirvonen, Espoo (FI); Mika Stahlberg, Espoo (FI)

(73) Assignee: F-Secure Corporation, Helsinki (FI)

( * ) Notice: Subject to any disclaimer, the term of this patent is extended or adjusted under 35 U.S.C. 154(b) by 51 days.

(21) Appl. No.: 14/940,388

(22) Filed: Nov. 13, 2015

(65) Prior Publication Data

US 2016/0142372 A1      May 19, 2016

(30) Foreign Application Priority Data

Nov. 19, 2014   (GB) .................................. 1420542.1

(51) Int. Cl.
| | |
|---|---|
| *H04L 29/06* | (2006.01) |
| *G06F 21/56* | (2013.01) |
| *G06F 21/62* | (2013.01) |
| *G06F 21/57* | (2013.01) |
| *G06F 21/55* | (2013.01) |

(52) U.S. Cl.
CPC ........ *H04L 63/1441* (2013.01); *G06F 21/554* (2013.01); *G06F 21/566* (2013.01); *G06F 21/577* (2013.01); *G06F 21/6245* (2013.01); *H04L 63/0227* (2013.01); *H04L 63/101* (2013.01); *H04L 63/108* (2013.01)

(58) Field of Classification Search
None
See application file for complete search history.

(56) References Cited

U.S. PATENT DOCUMENTS

| | | | | |
|---|---|---|---|---|
| 8,774,764 | B2 * | 7/2014 | De Froment | H04L 63/0428 370/310.2 |
| 2008/0003997 | A1 * | 1/2008 | Parkkinen | H04L 63/145 455/421 |
| 2009/0044276 | A1 * | 2/2009 | Abdel-Aziz | H04L 63/145 726/24 |
| 2009/0328161 | A1 * | 12/2009 | Puthenkulam | H04W 76/02 726/4 |
| 2013/0276063 | A1 * | 10/2013 | Hahm | H04W 12/08 726/3 |

FOREIGN PATENT DOCUMENTS

WO      WO 2007/056600         5/2007

OTHER PUBLICATIONS

Grossman, Jeremiah, "Hacking Intranet Websites from the Outside (Take 2) Fun with & without JavaScript Malware", White Hat Security, Jul. 2007, 6 pgs.

* cited by examiner

*Primary Examiner* — Hadi Armouche
*Assistant Examiner* — Andrew Steinle
(74) *Attorney, Agent, or Firm* — Harrington & Smith

(57) ABSTRACT

A method and device for preventing a browser-originating attack in a local area network. A security device in the local area network intercepts a message from a first device in the local area network towards a second device in the local area network. The message requests connection between the first device and the second device. The security device prompts a user of the first device to approve the connection. In the event that the user approves the connection the first device is allowed to connect to the second device, and in the event that the user does not approve the connection the connection attempt is terminated.

25 Claims, 4 Drawing Sheets

PREVENTING BROWSER-ORIGINATING ATTACKS

TECHNICAL FIELD

The invention relates to the field of preventing Browser-originating attacks, for example browser-originating attacks on devices in local networks arising from browser port scanning.

BACKGROUND

The Internet of Things (IoT) is the interconnection of uniquely identifiable embedded computing devices within the existing Internet infrastructure. For example, in some households there are already several Internet connected devices such as gaming consoles, Network Attached Storage (NAS) boxes, Smart TVs, tablets, smartphones, and laptops. All of these devices may connect to the Internet using the same home router, which acts as a Wi-Fi Access Point and allows the devices to connect to the Internet. In the future, more and more home and office devices will be connected to the Internet. Devices such as toasters and refrigerators may contain Wi-Fi chips and computing power.

In addition to IoT devices in the home, there are IoT devices outside the home network. Some home IoT devices, such as mobile phones or wearable devices, can roam between public networks (e.g. a 3G or 4G network) and the home Wi-Fi. Some IoT devices (such as Internet connected automobiles) are likely to only have the capability of connecting to public networks.

From a security perspective, IoT devices are a challenge. Many such devices are based on old version of freeware operating systems, such as Linux. These may lack automatic update capability and, due to limitations posed by lack of proper user interface, they do not have robust systems for authentication and authorization. This means that a vulnerability found in an open source library (serious and widespread examples from 2014 include "goto fail" CVE-2014-1266, "heartbleed" CVE-2014-0160, and "shellshock" CVE-2014-6271) is unlikely to be patched on IoT devices and unauthenticated attack vectors are likely to exist.

Since IoT devices in the home network contain computing and communications resources and are vulnerable to known exploits, it is highly likely that malicious attackers will start to target various devices at home. Compromised IoT devices can be infected by malware and harnessed to money making schemes such as DDoS, Bitcoin mining, Clickfraud, sending spam and so on.

Most home routers use Network Address Translation (NAT) between the IoT device and the Internet. This means that IoT devices at home are not readily accessible from the Internet. Furthermore, as most IoT devices are not used for surfing the Internet or reading email, attacks such as drive-by-downloads are not able to compromise these devices. One of the driving forces behind the development of NAT was the limited number of IP addresses available. With the introduction of IPv6 there is no need to extend the IP address space. However, NAT and similar technologies that prevent outside-in connections are likely to remain in use, in order to protect the home network.

For a malicious attacker to be able to compromise IoT devices such as Smart TVs, NAS storage devices and so on, they are likely to first compromise a laptop, smartphone or other device that may be used for web browsing or reading emails. Examples of such attacks include drive-by-downloads or social engineering schemes. Once the laptop has been compromised, the attacker can then attack other IoT devices served by the same home router. It is also possible that IoT devices in the local area network (LAN) can be compromised without actually installing any malware on the bridgehead device (typically a laptop, tablet, or smartphone). This can be accomplished by a technique sometimes referred to as Browser port scanning in which a web browser on a device is used as a stepping stone to scan and attack vulnerable devices in the local network.

Since at least 2006, it has been a widely known problem that websites on the Internet can scan and access intranet servers of companies if their employees visit those web sites (see, for example, Grossman, J. "JavaScript malware, port scanning, and beyond. Posting to the websecurity mailing list" (July 2006), and Grossman, J. "Browser port scanning without JavaScript" (Aug. 1, 2007) (November 2006)). This can be accomplished with JavaScript and to an extent also with plain HTML. The same attack has applications in attacks against home users now that homes have multiple devices.

In this kind of an attack, a user browses to a web page controlled by the attacker. The web page contains JavaScript code that accesses hosts in private address ranges (172.16.x.x, 192.168.x.x and 10.x.x.x for IPv4 and fc00::/7 for IPv6). The attacker doesn't have to scan the whole address space because home routers tend to default to just a few subnets such as 10.0.1.0/24 and 192.168.1.0/24, and hosts at home today are likely to be found at the lower ranges (2-10) within those subnets. If hosts are found, they are fingerprinted. This may be achieved by pattern matching the http index page they provide. If any hosts are vulnerable to known hffp exploits (such as Shellshock Bash vulnerability, CVE-2014-6271), the JavaScript can launch an exploit and open a remote connection from the vulnerable host to the attacker thus defeating the outside-in blocking provided by NAT or firewall.

Browser port scanning can be prevented by preventing devices in the LAN from communicating with each other. If all IoT devices in the LAN are prevented from connecting to port 80 on other devices, most of these attacks could be prevented. If this is limited only to connections with a browser user-agent, the problem of preventing valid remote control apps from working is avoided.

However, typically the same device that is likely to be used as the bridgehead launching the JavaScript scans is also the device (e.g. a laptop or smartphone) that the legitimate user uses when accessing the admin (web) interfaces of the various devices at home. If connecting from devices such as laptops and smartphones is prevented or made more difficult, then users are unlikely to use the device or are likely to disable the security features that prevent or limit connection

SUMMARY

It is an object of the invention to prevent or reduce the likelihood of successful browser-originating attack such as browser port scanning within a Local Area Network (LAN) that might compromise devices in the LAN and expose them to attack.

According to a first aspect, there is provided a method of preventing a browser-originating attack in a local area network. A security device in the local area network intercepts a message from a first device in the local area network towards a second device in the local area network. The message requests connection between the first device and the second device. The security device prompts a user of the first device to approve the connection. In the event that the user approves the connection the first device is allowed to connect to the second device, and in the event that the user does not approve the connection the connection attempt is terminated. An advantage of this is that user intervention is required to approve connections, and so browser-originating attacks are much less likely to be successful.

As an option, in the event that the first device is connected to the second device, the connection is terminated after a predetermined time period has elapsed.

The method optionally comprises determining that the user has approved the connection by receiving an input from the user at the security device. Alternatively, the method comprises determining that the user has approved the connection by sending a query for user approval to the first device and receiving from the first device a message confirming that the user approves the connection. The query for user approval optionally comprises any of a request for a password known to the user and the security device or a request to complete a non-automated task. As a further alternative option, the method comprises determining that the user has approved the connection by sending a query for user approval to a third device and receiving from the third device a message confirming that the user approves the connection.

As an option the first device and the second device are located in separate subnetworks and the security device is located at a common gateway for both subnetworks.

As an alternative option, the first device and the second device are located in separate Virtual Local Area Networks.

As a further alternative option, the first device and the second device are located in separate Wi-Fi networks and the security device serves both Wi-Fi networks. Note that the same technique can be used with other types of access network.

The security device is optionally located at a router serving the local area network.

The step of the security device prompting a user of the first device to approve the connection may be performed after a determination has been made that the message requesting connection between the first device and the second device does originate from a known browser and not otherwise.

The step of the security device prompting a user of the first device to approve the connection may be performed after performing a step of checking addresses of at least one website used at the first device within a predetermined time period against a whitelist of trusted websites and determining that the address of the at least one website at the first device is not provisioned in the whitelist of trusted websites.

The step of the security device prompting a user of the first device to approve the connection may be performed after determining that an address bar of a browser at the first device does not contain a trusted address.

The step of the security device prompting a user of the first device to approve the connection may be performed after determining that a browser at the first device has accessed a website within a prior predetermined time period. This ensures that all of the prior websites that the user has visited in the predetermined time period can be trusted.

According to a second aspect there is provided a security device for use in a local area network. The security device is provided with a receiver configured to intercept a message from a first device in the local area network towards a second device in the local area network, the message requesting connection between the first device and the second device. A processor is provided, configured to determine whether a user of the first device approves the connection. The processor is further configured to, in the event that the user approves the connection, allow the first device to connect to the second device and, in the event that the user does not approve the connection, terminate the connection attempt.

As an option the processor is further configured to, in the event that the first device is connected to the second device, terminate the connection after a predetermined time period has elapsed.

The security device is optionally provided with an input usable by the user to confirm that the user has approved the connection.

The security device is optionally provided with a transmitter configured to send a query for user approval to the first device. In this case the receiver is further configured to receive from the first device a message confirming that the user approves the connection.

The transmitter is optionally configured to send a query for user approval comprising any of a request for a password known to the user and the security device and a request to complete a non-automated task. This ensures that the user input is valid.

As an alternative option, a transmitter is provided that is configured to determine that the user has approved the connection by sending a query for user approval to a third device. In this case the receiver is further configured to receive from the third device a message confirming that the user approves the connection.

As an option, the first device and the second device are located in separate subnetworks and the security device is located at a common gateway for both subnetworks.

As an alternative option, the first device and the second device are located in separate Virtual Local Area Networks.

As an alternative option, the first device and the second device are located in separate Wi-Fi networks and the security device serves both Wi-Fi networks.

The security device is optionally located at a router serving the local area network.

According to a third aspect, there is provided a computer program comprising instructions which, when executed on a processor, cause the processor to carry out the method as described above in the first aspect.

According to a fourth aspect, there is provided a carrier containing the computer described above in the third aspect, wherein the carrier is one of an electronic signal, optical signal, radio signal, or non-transitory computer readable storage medium.

According to a fifth aspect, there is provided a method of preventing a browser-originating attack in a local area network. A security device in the local area network intercepts a message from a first device in the local area network towards a second device in the local area network. The message requests connection between the first device and the second device. The security device determines if the message requesting connection between the first device and the second device originates from a known browser. In the event that the message does not originate from a known browser, the security device allows the first device to connect to the second device. In the event that the message requesting connection does originate from a known browser, the security device prompts a user of the first device to approve the connection. In the event that the user approves the connection, the first device is allowed to connect to the second device. In the event that the user does not approve the connection, the security device terminates the connection attempt.

According to a sixth aspect, there is provided a security device for use in a local area network. The security device is provided with a receiver configured to intercept a message from a first device in the local area network towards a second device in the local area network, the message requesting connection between the first device and the second device. A processor is provided, configured to determine if the message requesting connection between the first device and the second device originates from a known browser. The processor is further configured to, in the in the event that the message requesting connection does not originate from a known browser, allow the first device to connect to the second device. The processor is further configured to, in the in the event that the message requesting connection does originate from a known browser, determine whether a user of the first device approves the connection. The processor is further configured to, in the event that the user approves the connection, allow the first device to connect to the second device. The processor is further configured to, in the event that the user does not approve the connection, terminate the connection attempt.

According to a seventh aspect, there is provided a method of preventing a browser-originating attack in a local area network. A security device in the local area network intercepts a message from a first device in the local area network towards a second device in the local area network. The message requests connection between the first device and the second device. The security device checks addresses of at least one website used at the first device within a predetermined time period against a whitelist of trusted websites. In the event that the address of the at least one website at the first device is provisioned in the whitelist of trusted websites, the security device allows the first device to connect to the second device. In the event that the address of the at least one website at the first device is not provisioned in the whitelist of trusted websites, the security device prompts a user of the first device to approve the connection. In the event that the user approves the connection the first device is allowed to connect to the second device. In the event that the user does not approve the connection, the security device terminates the connection attempt.

According to an eighth aspect, there is provided a security device for use in a local area network. The security device is provided with a receiver configured to intercept a message from a first device in the Focal area network towards a second device in the local area network, the message requesting connection between the first device and the second device. A processor is provided, configured to check addresses of at least one website used at the first device within a predetermined time period against a whitelist of trusted websites. The processor is further configured to, in the event that the address of the at least one website at the first device is provisioned in the whitelist of trusted websites, allow the first device to connect to the second device. The processor is further configured to, in the event that the address of the at least one website at the first device is not provisioned in the whitelist of trusted websites, determine whether a user of the first device approves the connection. The processor is further configured to, in the event that the user approves the connection, allow the first device to connect to the second device. The processor is further configured to, in the event that the user does not approve the connection, terminate the connection attempt.

According to a ninth aspect, there is provided a method of preventing a browser-originating attack in a local area network. A security device in the local area network intercepts a message from a first device in the local area network towards a second device in the local area network. The message requests connection between the first device and the second device. The security device determines if an address bar of a browser at the first device contains a trusted address. In the event that the address bar of the browser at the first device does contain a trusted address, the security device allows the first device to connect to the second device. In the event that the address bar of the browser at the first device does not contain a trusted address, the security device prompts a user of the first device to approve the connection. In the event that the user approves the connection, the first device is allowed to connect to the second device. In the event that the user does not approve the connection, the security device terminates the connection attempt.

According to the tenth aspect, there is provided a security device for use in a local area network. The security device is provided with a receiver configured to intercept a message from a first device in the local area network towards a second device in the local area network, the message requesting connection between the first device and the second device. A processor is provided, configured to determine if an address bar of a browser at the first device contains a trusted address. The processor is further configured to, in the in the event that the address bar of the browser at the first device contains a trusted address, allow the first device to connect to the second device. The processor is further configured to, in the in the event that the address bar of the browser at the first device does not contain a trusted address, determine whether a user of the first device approves the connection. The processor is further configured to, in the event that the user approves the connection, allow the first device to connect to the second device. The processor is further configured to, in the event that the user does not approve the connection, terminate the connection attempt.

According to an eleventh aspect, there is provided a method of preventing a browser-originating attack in a local area network. A security device in the local area network intercepts a message from a first device in the local area network towards a second device in the local area network. The message requests connection between the first device and the second device. The security device determines if a browser at the first device has accessed a website within a prior predetermined time period. In the event that the browser at the first device has not accessed a website within the prior predetermined time period, the security device allows the first device to connect to the second device. In the event that the browser at the first device has accessed a website within the prior predetermined time period, the security device prompts a user of the first device to approve the connection. In the event that the user approves the connection the first device is allowed to connect to the second device. In the event that the user does not approve the connection, the security device terminates the connection attempt.

According to a twelfth aspect, there is provided a security device for use in a local area network. The security device is provided with a receiver configured to intercept a message from a first device in the local area network towards a second device in the local area network, the message requesting connection between the first device and the second device. A processor is provided, configured to determine if a browser at the first device has accessed a website within a prior predetermined time period. The processor is further configured to, in the event that the browser at the first device has not accessed a website within the prior predetermined time period, allow the first device to connect to the second device. The processor is further configured to, in the event that the browser at the first device has accessed a website within the prior predetermined time period, determine whether a user of the first device approves the connection. The processor is further configured to, in the event that the user approves the connection, allow the first device to connect to the second device. The processor is further configured to, in the event that the user does not approve the connection, terminate the connection attempt.

DETAILED DESCRIPTION

Figure 1:
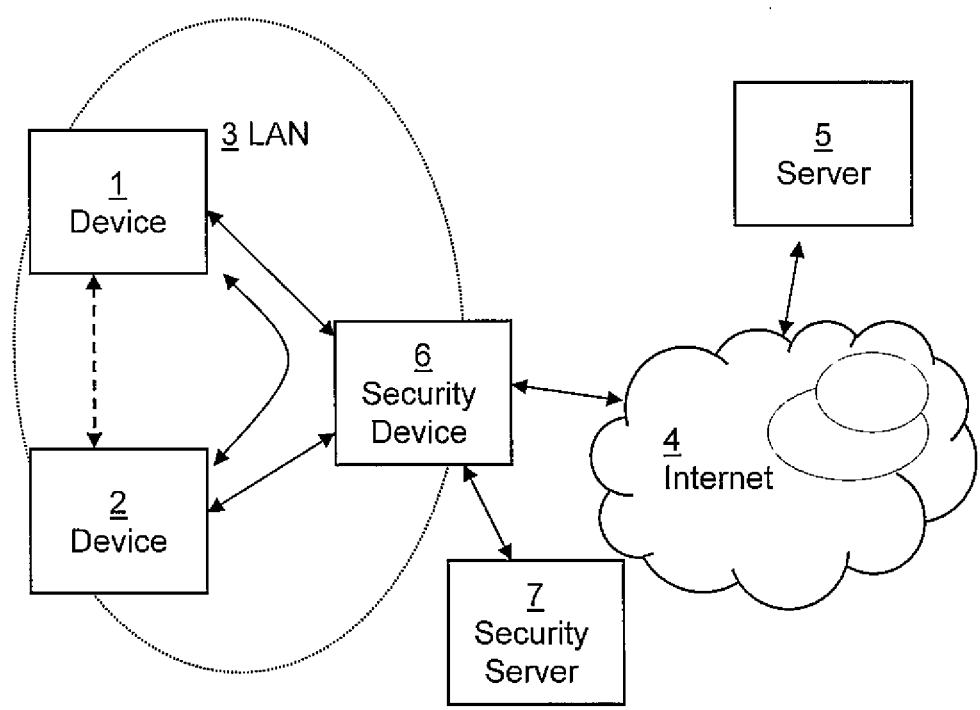
FIG. 1 illustrates schematically in a block diagram an exemplary network.

The following description sets forth specific details, such as particular embodiments for purposes of explanation and not limitation. But it will be appreciated by one skilled in the art that other embodiments may be employed apart from these specific details. In some instances, detailed descriptions of well-known methods, interfaces, circuits, and devices are omitted so as not obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Nodes that communicate using the air interface also have suitable radio communications circuitry. The software program instructions and data may be stored on computer-readable storage medium, and when the instructions are executed by a computer or other suitable processor control, the computer or processor performs the functions.

Thus, for example, it will be appreciated by those skilled in the art that diagrams herein can represent conceptual views of illustrative circuitry or other functional units. Similarly, it will be appreciated that flow charts represent various processes which may be substantially represented in computer readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, DSP hardware, reduced instruction set processor, hardware (e.g., digital or analog) circuitry including but not limited to ASIC(s) and/or field programmable gate array(s) (FPGA(s)), and (where appropriate) state machines capable of performing such functions.

In terms of computer implementation, a computer is generally understood to comprise one or more processors or one or more controllers. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" also refers to other hardware capable of performing such functions and/or executing software, such as the example hardware recited above.

Turning to FIG. 1, there is illustrated an exemplary network. The network includes device 1 and device 2, both in a LAN 3 and served by the same router (not shown). The devices 1, 2 can connect to the Internet 4. In this example, device 1 is connected to a malicious server 5. Device 1 is typically a user device such as a smartphone or laptop that a user uses to browse websites or read emails. Device 2 is typically a device such as a Smart TV that is vulnerable to an attack arising from a browser running on device 1.

In a typical attack scenario, user using device 1 is lured into visiting a website controlled by the attacker and connects to the malicious server 5. Since the connection is from inside-out (from device 1 to the server 5), NAT won't provide any protection.

Malicious JavaScript code from server 5 is run on device 1. It performs a network scan of local addresses and finds an active web server at device 2. The JavaScript code then proceeds to fingerprint device 2. Fingerprinting involves detecting the device type, version, and available services. If a known vulnerability is found on device 2, the JavaScript code proceeds to exploit device 2 by injecting a malicious payload into device 2. The malicious payload injected into device 2 opens a remote shell connection or similar back to the attacker at the malicious server 5. There are many variations of the above attack, but the one describe above is one of the simplest examples.

In order to address this type of attack, there is introduced a security device 6, also located in the LAN. The security device 6 may be a separate physical device or may be new functionality provided to the home router. The security device 6 is able to intercept and filter traffic between device 1 and device 2. This can be accomplished one of several ways. Exemplary ways of intercepting and filtering include the following:

1) Device 1 and device 2 are located in their own subnets and the security device acts as the default gateway (GW) for both devices (Layer 3 solution)
2) VLAN (Layer 2 solution)
3) Separate Wi-Fi for device 1 and device 2 (Layer 1 solution)
4) Solutions such as the security device 6 responding to Address Resolution Protocol (ARP) signalling faster than device 2. This may be achieved, for example, by optimizing the logic in the security device 6 or ensuring that it the security device 6 is located closer to device 1.

Once the security device 6 is aware that device 1 is trying to connect to a web server (port 80) on device 2, it redirects that call to its own security server 7. Note that the security server 7 is illustrated as a separate function to the security device 6 in FIG. 1, but its functions could be implemented at the security device 6 in which case a separate security server 7 is not required. It is important for the security device 6 to check the user-agent string in the call so that it won't start displaying question web pages to non-browser applications or other automatic web connections. These should only be displayed to browsers with a human user present, such as the browser being used on device 1. It is only necessary to display question pages to a browser with a human user present because stepping stone attacks use such browsers.

Figure 2:
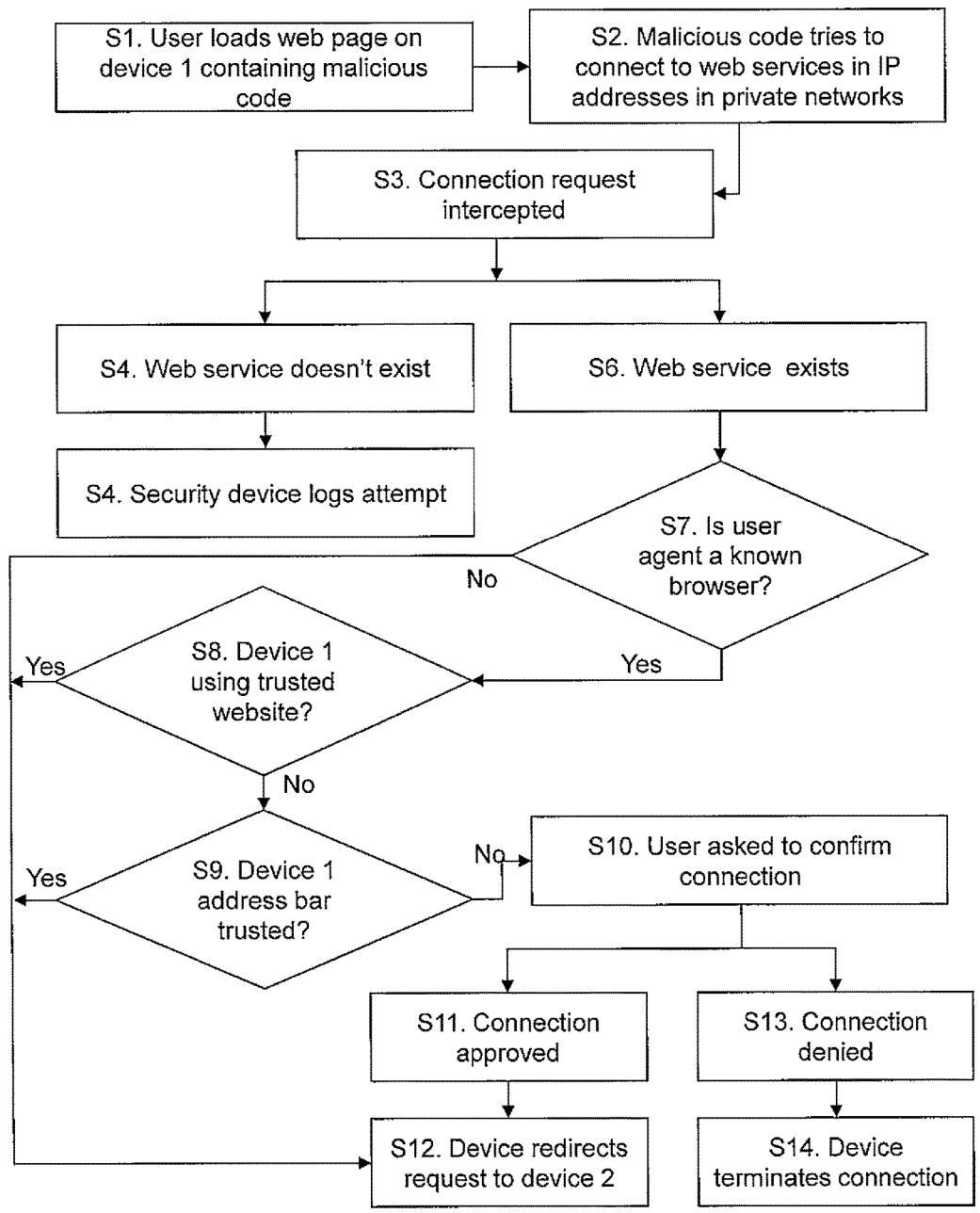
FIG. 2 is a flow diagram showing exemplary steps.

FIG. 2 is a flow diagram illustrated an exemplary sequence. The following numbering corresponds to that of FIG. 2:

S1. The user loads a web page from the malicious server 5 that contains malicious code (such as JavaScript). The user has been tricked into doing this, for example using a social engineering scheme to trick the user into clicking on a link.

S2. The malicious code attempts to connect to web services using IP addresses (such as that of device 2) in the private LAN.

S3. The security device 6 intercepts the attempt to connect to a web server on device 2 and redirects the request to the security server 7 (although as described above, the functionality of the security server 7 may be implemented in the security device 6 in which case the security server 7 is not required).

S4. It may be that a web service does not exist on device 2, in which case the procedure moves to step S5.

S5. As a web service does not exist on device 2, the attack cannot proceed. However, the security device logs the attempt and the procedure ends.

S6. It may be that a web service exists on device 2, in which case the procedure moves to step S7.

S7. A check is made to determine if the user agent is a known browser or not. If it is not then the procedure moves to step S12, if it is then the procedure moves to step S8.

S8. In an optional embodiment, a determination is made to see if device 1 has only been using trusted websites within the last predetermined time period (say, a few minutes). Trusted websites may be provisioned, for example, using a whitelist at the security device 6 or the security server 7. If the recent websites are trusted then the connection can be approved without any user input, as a JavaScript browser port scanning attack is unlikely to have originated from trusted websites, and so the procedure continues at step S12. A similar procedure can be carried out if the browser at device 1 has not made any Internet connections over a predetermined time period prior to attempting to connect to device 2. Such connections are normally allowable because malicious JavaScript running at device 1 is typically no longer active when the user of device 1 has closed the browser or navigated to another page. This ensures that all websites visited by the user using device 1 need not be checked against a whitelist, only ones recently visited, If the website is not known or trusted, then the procedure continues at step S9.

S9. In a further optional embodiment, JavaScript is run to check the address bar (e.g. window.location.href) of the browser at device 1. If the address bar contains only the private address of the local device or a whitelisted URL (e.g. support site of the device manufacturer), the connection can be approved and the procedure proceeds to step S12, otherwise the procedure continues at step S10. Note that steps S8 and S9 are optional but can greatly reduce the amount of times a user is requested to approve or deny a connection between devices, and so would improve the user's Quality of Experience.

S10. The user is prompted to confirm the connection to device 2. This may be implemented in multiple different ways. In all of these, the security device 6 displays the prompt using the web browser (or a dedicated application) at device 1. Exemplary ways that the user may be asked to confirm the connection include the following:

1. The security device 6 has a button that needs to be pressed in order for the connection to proceed;
2. The user is prompted to solve a simple task that's simple for humans but difficult for JavaScript code (e.g. CAPTCHA)
3. The user is prompted to enter a predefined password known only to the user and the security device;
4. The user needs to open a mobile application and approve the connection there
5. If the device has a speaker and a microphone it can ask the user to confirm the connection audibly.
6. The user clicks on a link to accept the connection. This is a weak technique from a security perspective but it may be adequate as bypassing it requires additional, product specific steps from the attack.
7. Note that if whitelisting is used, or connections between devices in the local network are undesirable, the connection to device 2 may simply be blocked without seeking user intervention.

A common feature of the above techniques is that the JavaScript code finds it difficult or impossible to approve the connection and some form of user intervention is required. In this way, if a user is attempting to use device 1 (e.g. a laptop) to connect to device 2 (e.g. a Smart TV), he is prompted to confirm the connection. If the connection is the result of a Browser port scanning attack, the user will not confirm the connection as he has not attempted to initiate the connection.

If the user approves the connection (e.g. by entering the correct password or solving the captcha), then the procedure moves to step S11. If the user does not approve the connection then the procedure moves to step S13.

S11. The devices 1, 2 are permitted to open new connections for a pre-defined, user-configurable period of time (e.g. 2 hours).

S12. The security device 6 redirects the request to device 2 and the connection is made between device 1 and device 2. After a predefined time window, if any new connections are opened between the devices, there will be another verification requested (step S11). The user may be provided a way of changing the time period for which the approval is valid.

S13. The user denies the connection, and the security device 6 is aware of this denial.

S14. The security device 6 terminates the connection so there is no connection between device 1 and device 2. The security device 6 logs the attempt.

Figure 3:
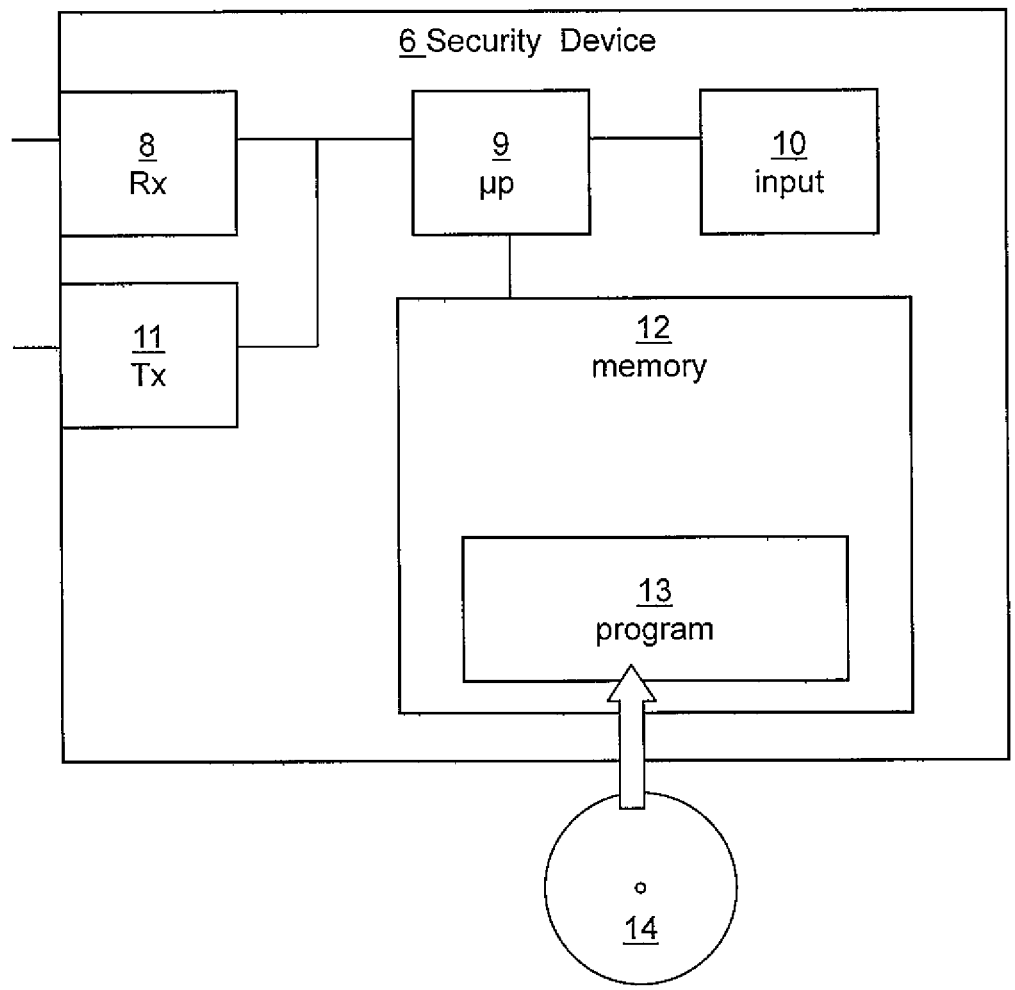
FIG. 3 illustrates schematically in a block diagram an exemplary security device.

Turning now to FIG. 3, there is illustrated schematically in a block diagram an exemplary security device 6. The security device 6 is provided with a receiver 8 that is configured to intercept an attempt from device 1 in the LAN network to connect to device 2. A processor 9 is configured to determine whether a user of device 1 approves the connection. The processor 9 is further configured to, in the event that the user approves the connection, allow device 1 to connect to device 2. The processor 9 further configured to, in the event that the user does not approve the connection, terminate the connection attempt.

There are several ways in which the security device 6 can determine if the user approves the connection. In a first embodiment, the security device 6 itself is provided with an input device 10 such as a button that a user can press to indicate that he approves the connection of device 1 to device 2 (for example, if he wants to control device 2 using device 1).

Another way in which the security device 6 can determine if the user approves the connection is for the security device 6 to be provided with a transmitter 11. The transmitter 11 is configured to send a query for user approval to device 1 (the processor 9 must first have determined that device 1 is able to display such a query). The receiver 8 is further configured to receive from device 1 a message confirming that the user approves the connection. The query may be, for example, a request for a password known to the user and the security device, or a request to complete a non-automatable task such as correctly reading a CAPTCHA.

Another way in which the security device 6 can determine if the user approves the connection is for the transmitter 11 to send a query for user approval to a third device such as the users mobile phone. The receiver 8 is further configured to receive from the third device a message confirming that the user approves the connection.

It is advantageous to co-locate the security device 6 with a router serving the LAN, but it may be a separate unit.

The security device 6 is also provided with a non-transitory computer readable medium in the form of a memory 12. This may be used to store a computer program which, when executed by the processor 9, causes the processor 9 to behave as described above. Note that the computer program may be stored on and provided from an external source 14. This may be a further non-transitory computer readable medium such as a CD-ROM or a flash drive, or a transitory computer readable medium such as a carrier wave.

Figure 4:
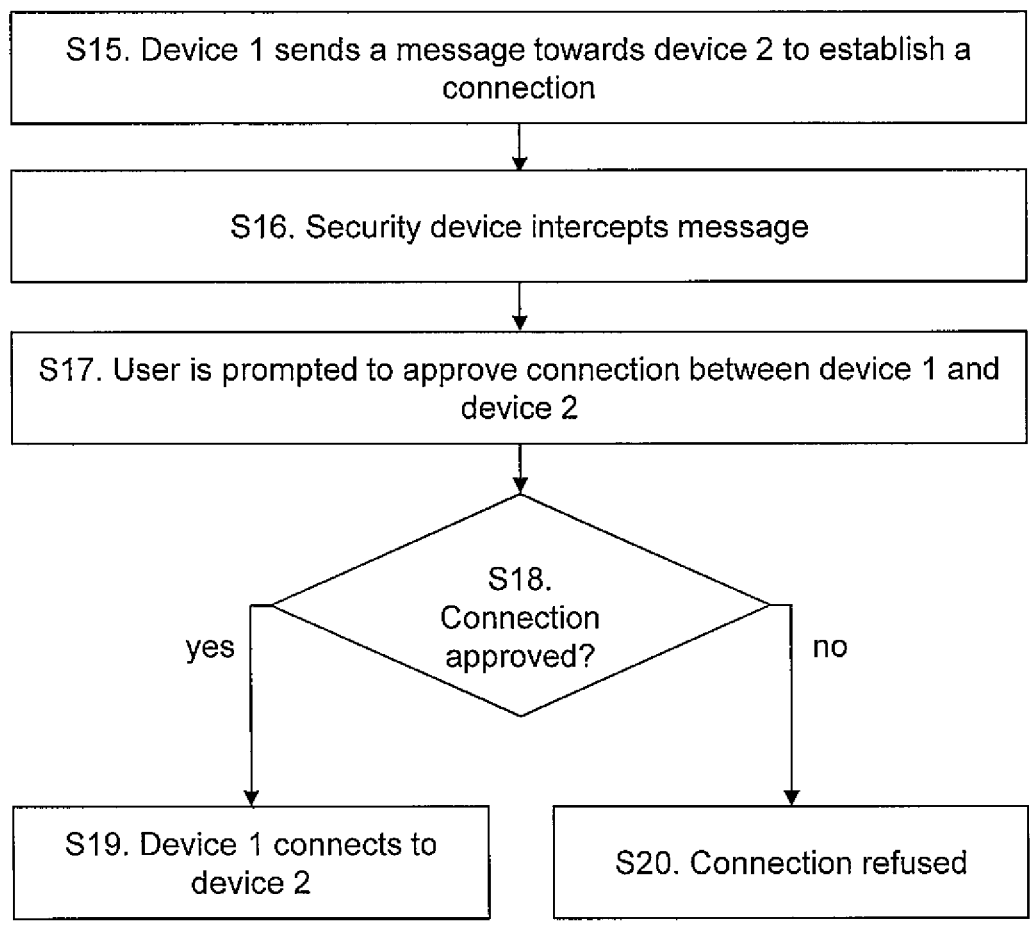
FIG. 4 is a flow diagram illustrating exemplary steps.

The basic principles are illustrated in FIG. 4, with the following numbering corresponding to that of FIG. 4:

S15. Device 1 sends a message towards device 2 to attempt to establish a connection between the two devices. At this stage, it is not known whether this has been initiated by the user, has a benign and valid reason, or is a result of a browser port scanning attack.

S16. The security device 6 intercepts the message.

S17. The user is prompted to approve the connection. There are many ways that a user may be prompted, some examples of which are provided above.

S18. A determination is made as to whether the user approves the connection between device 1 and device 2. If the connection is approved then the procedure moves to step S19, if the connection is not approved then the procedure moves to step S20.

S19. Device 1 and device 2 are connected. As described above, this connection may be for a limited time only.

S20. The connection between device 1 and device 2 is not established, and the attempt to connect is logged at the security device 6.

The techniques described above allow a user to approve a connection between two devices in a LAN. This ensures that non-approved connections are not established. In this way, a user may allow a device such as a laptop to connect to a further device such as a Smart TV, but if the laptop is used as a stepping stone to scan and attack the Smart TV by connecting to it, the connection will not be approved thereby preventing a browser port scanning attack using the laptop to compromise the Smart TV.

It will be appreciated by the person of skill in the art that various modifications may be made to the above described embodiment without departing from the scope of the present invention. In particular, the system architecture may vary, and a device can use information from a local server or a cloud database, or a backend server can compare the metadata relating to the suspicious software application.

The following abbreviations have been used in the above application:
ARP Address Resolution Protocol
ASIC Applications Specific Integrated Circuitry
DSP Digital Signal Processor
GW Gateway
IoT Internet of Things
LAN Local Area Network
NAS Network Attached Storage
NAT Network Address Translation
VLAN Virtual Local Area Network

The invention claimed is:

1. A method of preventing a browser-originating attack in a local area network, the method comprising, at a security device in the local area network: (a) intercepting a message from a first device in the local area network towards a second device in the local area network, the message requesting connection between the first device and the second device; (b) prompting a user of the first device to approve the connection; (c) in the event that the user approves the connection, allowing the first device to connect to the second device; and (d) in the event that the user does not approve the connection, terminating the connection attempt;
wherein step (b) is performed after a determination has been made that the message requesting connection between the first device and the second device does originate from a known browser.

2. The method according to claim 1, further comprising, in the event that the first device is connected to the second device, terminating the connection after a predetermined time period has elapsed.

3. The method according to claim 1, further comprising determining that the user has approved the connection by receiving an input from the user at the security device.

4. The method according to claim 1, further comprising determining that the user has approved the connection by sending a query for user approval to the first device; and receiving from the first device a message confirming that the user approves the connection.

5. The method according to claim 4, wherein the query for user approval comprises any of: a request for a password known to the user and the security device; and a request to complete a non-automated task.

6. The method according to claim 1, further comprising determining that the user has approved the connection by sending a query for user approval to a third device; and receiving from the third device a message confirming that the user approves the connection.

7. The method according to claim 1, wherein the first device and the second device are located in separate sub-networks and the security device is located at a common gateway for both subnetworks.

8. The method according to claim 1, wherein the first device and the second device are located in separate Virtual Local Area Networks.

9. The method according to claim 1, wherein the first device and the second device are located in separate wireless networks and the security device serves both wireless networks.

10. The method according to claim 1, wherein the security device is located at a router serving the local area network.

11. The method according to claim 1, wherein step (b) is performed after having performed a step of checking addresses of at least one website used at the first device within a predetermined time period against a whitelist of trusted websites and determining that the address of the at least one website at the first device is not provisioned in the whitelist of trusted websites.

12. The method according to claim 1, wherein step (b) is performed after determining that an address bar of a browser at the first device does not contain a trusted address.

13. The method according to claim 1, wherein step (b) is performed after having determined that a browser at the first device has accessed a website within a prior predetermined time period.

14. A security device for use in a local area network, the security device comprising: a receiver configured to intercept a message from a first device in the local area network towards a second device in the local area network, the message requesting connection between the first device and the second device; a processor configured to determine whether a user of the first device approves the connection; the processor further configured to, in the event that the user approves the connection, allow the first device to connect to the second device; and the processor further configured to, in the event that the user does not approve the connection, terminate the connection attempt;
    wherein determining whether a user of the first device approves the connection is performed after a determination has been made that the message requesting connection between the first device and the second device does originate from a known browser.

15. The security device according to claim 14, wherein the processor is further configured to, in the event that the first device is connected to the second device, terminate the connection after a predetermined time period has elapsed.

16. The security device according to claim 14, further comprising an input usable by the user to confirm that the user has approved the connection.

17. The security device according to claim 14, further comprising a transmitter configured to send a query for user approval to the first device; and the receiver is further configured to receive from the first device a message confirming that the user approves the connection.

18. The security device according to claim 17, wherein the transmitter is configured to send a query for user approval comprising any of: a request for a password known to the user and the security device; and a request to complete a non-automated task.

19. The security device according to claim 14, further comprising a transmitter configured to determine that the user has approved the connection by sending a query for user approval to a third device; and the receiver is further configured to receive from the third device a message confirming that the user approves the connection.

20. The security device according to claim 14, wherein the first device and the second device are located In separate subnetworks and the security device is located at a common gateway for both subnetworks.

21. The security device according to claim 14, wherein the first device and the second device are located in separate Virtual Local Area Networks.

22. The security device according to claim 14, wherein the first device and the second device are located in separate wireless networks and the security device serves both wireless networks.

23. The security device according to claim 14, wherein the security device is located at a router serving the local area network.

24. A non-transitory computer program, comprising instructions which, when executed on a processor, cause the processor to carry out a method of preventing a browser-originating attack in a local area network, the method comprising, at a security device in the local area network:
    (a) intercepting a message from a first device in the local area network towards a second device in the local area network, the message requesting connection between the first device and the second device;
    (b) prompting a user of the first device to approve the connection;
    (c) in the event that the user approves the connection, allowing the first device to connect to the second device; and
    (d) in the event that the. user does not approve the connection, terminating the connection attempt;
    wherein step (b) is performed after a determination has been made that the message requesting connection between the first device and the second device does originate from a known browser.

25. A carrier containing the computer program of the claim 24, wherein the carrier is a non-transitory computer readable storage medium.

\* \* \* \* \*